May 9, 1950  S. A. SCHERBATSKOY  2,507,351
TRANSMITTING OF INFORMATION IN DRILL HOLES
Filed Nov. 23, 1945  3 Sheets-Sheet 1
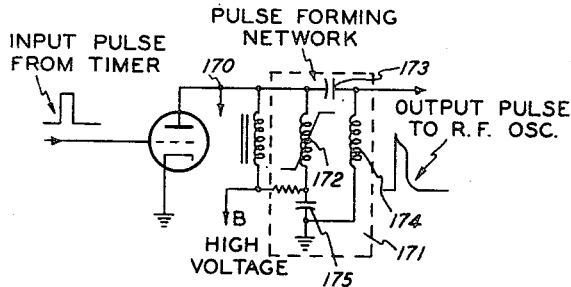
FIG. 6
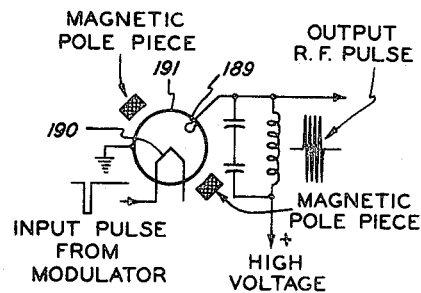
FIG. 10
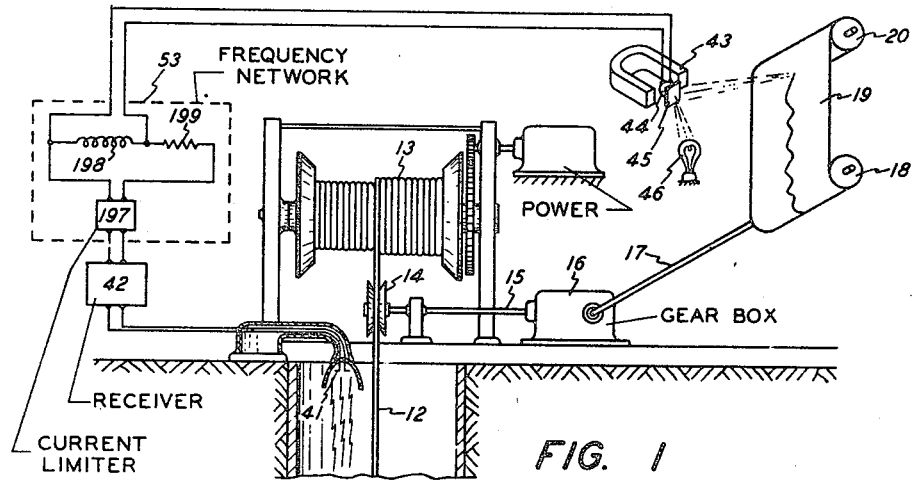
FIG. 1
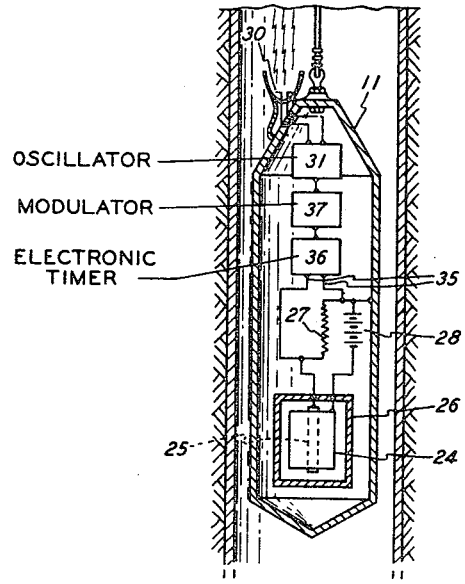
INVENTOR.
Serge A. Scherbatskoy May 9, 1950 S. A. SCHERBATSKOY 2,507,351
TRANSMITTING OF INFORMATION IN DRILL HOLES
Filed Nov. 23, 1945 3 Sheets-Sheet 2
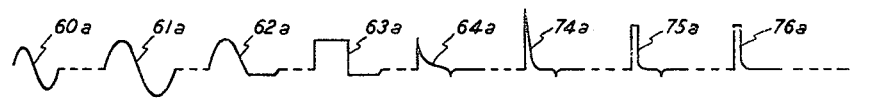
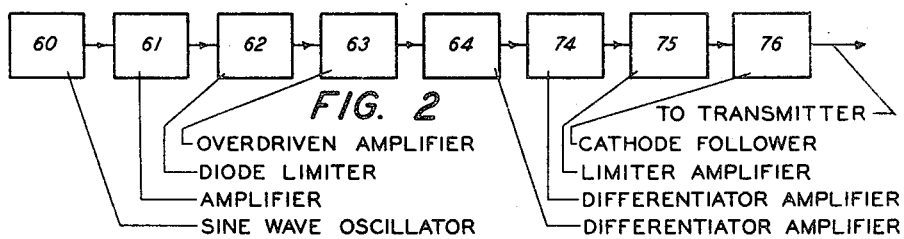
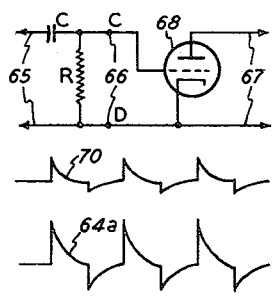
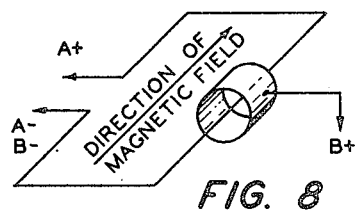
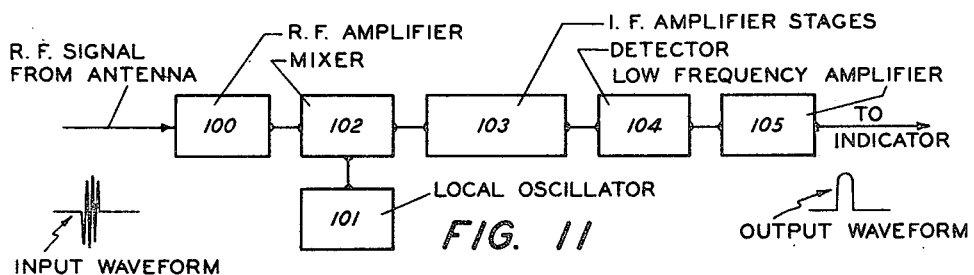
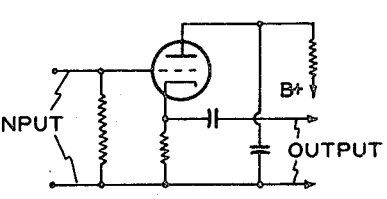
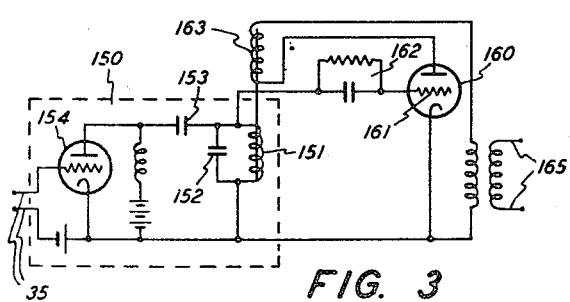
INVENTOR.

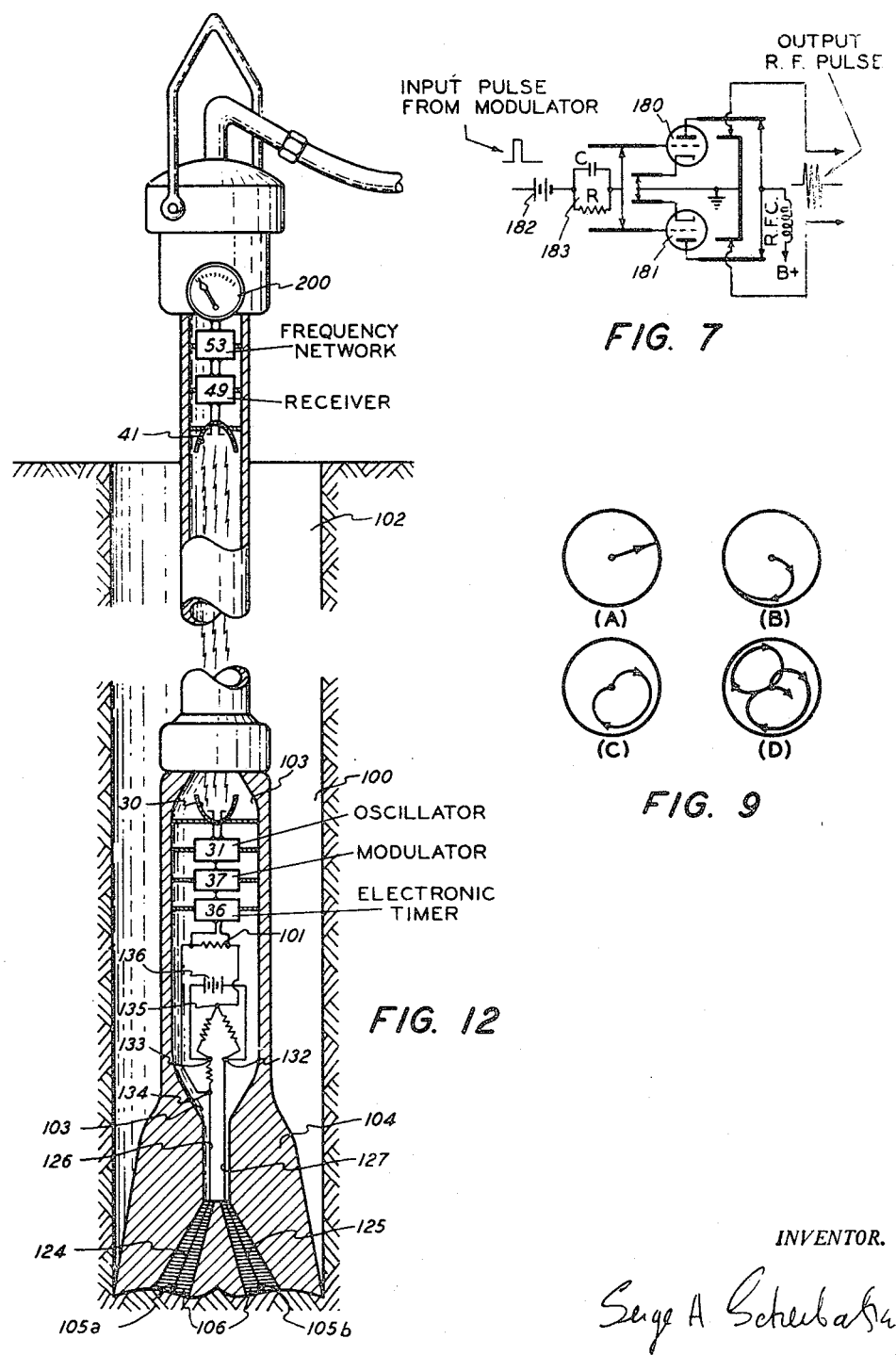

Patented May 9, 1950

2,507,351

UNITED STATES PATENT OFFICE 2,507,351

TRANSMITTING OF INFORMATION IN DRILL HOLES

Serge A. Scherbatskoy, Tulsa, Okla., assignor to Well Surveys, Incorporated, Tulsa, Okla., a corporation of Delaware Application November 23, 1945, Serial No. 630,397

1 Claim. (Cl. 177—352)

This invention relates to the art of subsurface geophysical prospecting by the lowering of measuring instruments into well bores, drill holes or the like and the recording of the measurements there made by surface equipment. More particularly this invention is concerned with the transmission of the measurements made in the well bores, from the measuring instruments in the wells to the recording equipment located on the surface of the earth.

Prior to this invention many devices have been proposed for lowering into drill holes, well bores and the like to make various types of measurements indicative either of the nature of the strata surrounding the well bore, or of the physical character of the well bore itself. As a few examples of such devices, mention may be made of the electrical resistivity measuring devices commonly used to measure the relative resistivity of various portions of the formations lying alongside of well bores, numerous devices used to determine deviations from vertical well bores, devices for measuring the natural radioactivity of the strata surrounding wells and devices for exposing the formations around the well to artificially produced radiations and measurnig the scattering of these radiations or the secondary radiations caused thereby.

In all of these devices and in many other devices of a generally similar nature it has been necessary to transmit the information obtained by the instrument in the well to the recording mechanism on the surface. For this purpose it has heretofore been common to use a supporting cable for the instrument in the well which cable contains a plurality of insulated conductors over which electrical signals are transmitted from the instrument to the surface. Great difficulty has arisen in connection with the practical use of such cables, however, for the pressures encountered by the cable in the well and the oil, abrasion, and other deteriorating influences to which it is subjected in the course of normal use are such that only an extremely expensive and very carefully constructed cable can withstand the treatment for even a short time. Even the best cables that have been constructed for this purpose have a relatively short life and the expense of replacing them is quite large.

According to this invention, in its broadest aspect, that difficulty is avoided by sending the indication from the measuring instrument in the well to the surface by means of extremely short impulses of ultrahigh frequency waves, said impulses succeeding each other at a frequency which represents the indication to be transmitted.

A more complete understanding of the details of the present invention and of its numerous advantages may be obtained by a study of the following detailed description of two embodiments which embodiments are also illustrated in the appended drawings. It is to be understood, however, that these are but two illustrative embodiments and in no way limit the applicability of the principles of this invention to other types of measurements than those illustrated or exclude any one of a great number of modified forms that may readily be devised once the principles of the invention are understood.

In the drawings,

Figure 1 is a diagrammatic illustration of a device for measuring the natural radioactivity of subsurface formations and transmitting the results of the measurements to the surface in accordance with the principles of this invention;

Fig. 2 shows diagrammatically an electronic timer;

Fig. 3 shows diagrammatically a sine wave oscillator of a controllable output frequency;

Fig. 4 shows a differentiation amplifier;

Fig. 5 shows a cathode follower;

Fig. 6 shows a modulator;

Fig. 7 shows an oscillator;

Fig. 8 shows the physical structure of a magnetron;

Fig. 9 shows electron paths in a magnetron;

Fig. 10 shows the circuit of a magnetron oscillator;

Fig. 11 shows a radio receiver;

Fig. 12 shows another embodiment of my invention for indicating the formation characteristics during the drilling operations.

Referring now more particularly to Fig. 1, the exploratory apparatus proper consists of a housing 11 which is lowered into the bore hole by means of a cable 12. The cable has a length somewhat in excess of the length of the hole to be explored and is normally wound on a drum 13 positioned adjacent to the top of the drill hole. The cable may be unwound from the drum 13 to lower the exploring apparatus into the hole and may be rewound upon the drum to raise the exploring apparatus. Between the drum 13 and the hole there is a measuring reel 14 which is adjusted to roll on cable in such a manner that the number of revolutions of the reel corresponds to the amount of cable which has passed up or down in the drill hole. The reel is mounted on a shaft 15, and the motion of the shaft is transmitted through a gear box 16 to another shaft 17 which turns a spool 18 to wind a photographic film 19, the film being supplied from a feed spool 20.

The housing 11 of the exploratory apparatus comprises an ionization chamber 26 preferably filled with argon at a pressure of around 1500 to 2000 pounds per square inch and containing a pair of electrodes 24 and 25 which are connected through the walls of the casing to a resistor 27 and a battery 28. The battery 28 and the resistor 27 are connected in series with the two electrodes so that the battery will furnish a potential across the electrodes and the voltage drop across the resistor will be proportional to the current flow between the electrodes in the chamber. The positive side of the battery is preferably grounded to the casing 11.

The transmitting arrangement of transmitting the output of the ionization chamber to the top of the drill hole consists of an electronic timer 36 connected to the output terminals 35 of the resistor 27, a modulator 37 connected to the output of the electronic timer, an oscillator 31 connected to the output of the modulator and of an antenna 30 connected to the oscillator.

A receiving antenna 41 is conveniently located at the top of the drill hole for receiving the signals transmitted upwardly by the antenna 30, said receiving antenna being in turn connected to a receiver 42. The receiver 42 has its output connected to a frequency network 53, which in turn is connected to the recording galvanometer 43. The recording galvanometer includes a moving coil 44 connected to the output of the frequency network 53 and a mirror 45 attached to the moving coil. The mirror is adapted to reflect a beam of light from a lamp 46 onto the sensitive film 19 to produce (after the film has been developed) a record of the well log.

The transmission system above described may obviously be varied in many ways and still be within the spirit of this invention. Likewise, it may be used with many types of measuring instruments, for example, a measuring instrument of the type shown by any of the following: U. S. Patent 2,133,776 granted to John C. Bender, U. S. Patent 2,038,046 granted to J. J. Jakosky, U. S. Patent 2,018,080 granted to Martienssen.

In practical application the output of the ionization chamber derived from the terminals 35 is applied to the electronic timer 36 and causes the electronic timer to switch the oscillator 31 on and off at precise and regular intervals To accomplish this function, the electronic timer generates a series of identical impulses, which have a certain length or duration and which occur at a controllable and variable rate of repetition. This rate of repetition is known as the pulse recurrence frequency, and is controllable by means of a voltage derived from across the terminals of the resistor 27.

Under ordinary circumstances the voltage control pulse from the electronic timer does not possess sufficient power to control the operation of the r. f. oscillator 31. And therefore, additional amplification of the control pulse is necessary before it can be used to modulate the output stage of the oscillator 31.

This power amplification of the control pulse is performed by the modulator in the block 37 which supplies a high-amplitude rectangular pulse of the same duration and the same pulse recurrence frequency as the original control pulse.

The application of this high-amplitude rectangular pulse to the r. f. oscillator in the block 31 permits the output tubes to generate ultra-high frequency pulses. The length or duration of these pulses may be determined by the duration of the rectangular power pulses from the modulator 37.

Thus a constant barrage of electromagnetic high frequency pulses are radiated into space by the oscillator 31 through the antenna 30 and move within the confines of an extremely narrow beam. The pulses are radiated in succession of a frequency that represents the output of the ionization chamber 26 and travel at the speed comparable to the speed of light upwards to the top of the drill hole and are received by the receiving antenna 41 located at the top of the drill hole.

The function of the receiving antenna 41 is to receive or pick up the incoming signal and pass it to the receiver 42 with a minimum of loss. The receiving antenna system includes the transmission line connecting the antenna array 41 with the receiver 42.

In the receiver 42 the ultra-high frequency pulses picked up by the antenna 41 are demodulated and transformed into substantially rectangular D. C. pulses having the same duration and frequency of recurrence as the corresponding ultra-high frequency pulses. It is apparent that the frequency of these modulated pulses represents the measurements performed by the ionization chamber. Accordingly, these pulses are subsequently transmitted to a frequency network 53 which is adapted to produce across its output terminals a D. C. voltage having a magnitude representing the frequency of the pulses applied to the input terminals. Consequently, the D. C. voltage derived from the output of the frequency network 53 represents the measure to be performed and is subsequently transmitted to the galvanometer 43 for recording.

Consider now more in detail various elements contained within the exploring housing 11, such as electronic timer 36, modulator 37, oscillator 31, and the receiver 32, located on the top of the drill hole.

*Electronic timer*

The function of electronic timer 36 is the creation of the basic control impulses which are applied to the oscillator 31 through the modulator 37 and cause the oscillator to generate similar pulses of ultra-high radio frequency energy of extremely high power. The frequency at which these pulses succeed each other, i. e. the pulse recurrence frequency is variable, said frequency being at any time controlled by and representing the magnitude of the D. C. voltage derived from the resistor 27. Consequently, the pulse recurrence frequency represents at any time the intensity of gamma radiations detected by the ionization chamber 26.

The electronic timer is so called because its function is purely electronic; it is generally concerned with wave shapes of fairly low frequencies in the audio range. Since wave forms emanating from the electronic timer control the oscillator 31, the timing circuits must function with extreme microsecond precision. A minute error in adjustment of any part of the timing circuits will be magnified a hundredfold by the time it reaches the oscillator.

It may be assumed, then, that most electronic timing circuits consist of several electronic stages—the number contingent upon the desired degree of sharpness, the amount of power output required, and the desired stability of the pulse recurrence frequency.

The pulse recurrence frequency is normally determined in the very first stage of the electronic timer. Any type of oscillator having a frequency controllable by the voltage derived from resistor 27 may be used. The shape of the wave from the master oscillator stage is not important, but the wave must be recurrent at a controllable frequency representing the output of the ionization chamber 26.

This initial wave form is then applied to a series of distortion pulse-shaping, and amplifying stages to achieve steep-sided voltage pulses of a given duration. All of these special types of electronic circuits assist in the shaping of the ouput pulse form of the electronic timer without affecting the pulse recurrence frequency of the wave form.

The electronic timer that I have chosen in the present embodiment is illustrated diagrammatically in Fig. 2 and is of the type in which a circuit is provided for generating a recurrent wave shape which is converted into the desired output pulse shape by the use of distortion and pulse forming stages. The electronic timer shown in Fig. 2 is also called a sine wave oscillator timer, since the initial stage of the circuit designated by block 60 consists of a generator of sine waves. These sine waves designated diagrammatically by numeral 60a would recur at a controllable frequency, the pulse recurrence frequency which is relatively low in audio spectrum—between 250 and 5000 per second, and represents the output of the ionization chamber.

The generator of sine waves 60 is shown diagrammatically in Fig. 3 and consists essentially of a vacuum tube 160 having a tuning system 150 connected to the grid 161 through a condenser leak 162. The plate circuit of the tube is inductively coupled to the grid circuit by means of an inductance 163 interlinking with the inductance 151, said inductance 151 being comprised within the tuninug system 150. The output of the oscillator is derived from the terminals 165 and has a frequency determined by the elements comprised within the tuning system 150. The tuning system 150 consists of three parallel paths consisting of an inductance 151, a capacitance 152, and a capacitance 153 in series with the plate resistance of a three-electrode tube 154. The tube 154 has a controllable grid potential that is derived from the input terminals 35 and determines the value of the plate resistance of the tube. It is thus apparent that the voltage derived from the resistor 27 and applied across the terminals 35 controls the value of the plate resistance of the tube 154, which in turn determines the natural frequency of the tuninug system 150. The remaining elements of the oscillator shown in Fig. 3 are conventional and need not to be described here.

Thus, after having generated a sine wave such as 60a by means of the oscillator 60 constituting the initial stage of the electronic timer, the signal is then applied to a Class A (distortionless) amplifier to increase the voltage amplitude to a very high value. Such an amplifier is designated by block 61.

The signal voltage derived from the amplifier 61 and designated by the numeral 61a is then applied to a diode limiter, which is connected in such a way that it acts as a half-wave rectifier—diminishing one-half of the sine wave cycle. The other half-wave remains at a relatively high voltage amplitude, however, and is next applied to an overdriven amplifier. The diode limiter is designated by 62 and its output voltage has a shape designated by 62a.

One of the most common of the many distortion circuits is the overdriven amplifier, or squaring amplifier designated by block 63. It comprises an ordinary triode or tetrode, operating with normal plate voltage, with the grid biased at about cut-off. Instead of using a normal input signal voltage on the grid of the tube, however, the full signal voltage from the diode limiter is applied directly to the grid. The resulting output wave form is designated by numeral 63a. The flat top of the wave is caused by a "damping" effect when excessive grid current is allowed to flow; the flat bottom is due to the plate-current cut-off characteristic of the tube. The effective grid potential differs from the actual input wave due to the heavy "loading" effect or "damping" effect caused by the flow of grid current. The plate voltage variations follow grid changes, and produce steep-front waves approaching the shape of square waves.

The voltage 63a derived from the overdriven amplifier 63 is then applied to a differentiator amplifier designated by the block 64 and illustrated more in detail in Fig. 4.

The circuit shown in Fig. 4 is essentially a short time constant (R. C.) circuit having input terminals 65, output terminals 66 and comprising suitably chosen capacitor C and resistor R. This circuit is followed by an amplifier 68 having output terminals 67.

When the leading edge of a steep voltage wave 63a derived from the overdriven amplifier 63 is applied to the terminals 65, the condenser C charges according to an exponential curve. And the current in the R. C. circuit jumps to maximum and then decreases according to an exponential curve. The resultant voltage drop across the resistor of the circuit that is derived from terminals 66 likewise jumps to maximum and then decreases according to an exponential curve. The voltage derived from terminals 66 is designated by numeral 70 and is characterized by a peaked wave shape with a sharp, steep leading edge. We ignore the diminshed negative-going peak, since we are only concerned with the positive-going half cycle of the peaked wave. This voltage is subsequently amplified in the amplifier 68 and appears across the output terminals 67 in the form shown as 64a.

The change which we have performed on the original square-wave voltage 63a is known as differentiation or peaking. And the short time constant (R. C.) circuit 64 is sometimes referred to as a peaking circuit.

An examination of the peaked wave voltage 64a at the first differentiator amplifier 64 shows that we have created something of a triangular pulse, which we know will recur regularly at the frequency established by the sine wave oscillator 60. However, the triangular output wave of the first differentiator amplifier 64 has no measurable width at any point along the slope; further, the pulse is much too wide to be of any practical use. We must, therefore, repeat the entire process of differentiation and amplification in order to produce a much narrower and more sharply defined pulse. This process is repeated by means of a second differentiation amplifier 74.

Any desired pulse width can be obtained in the process of differentiation, by choosing appropriate values for the resistance and condenser in the short time constant (R. C) circuit, which will, in turn, determine the slope of the trailing edge of the signal pulse.

The output of the second differentiator amplifier 74 has been designated by 74a and it can thus be of the required duration for operation. At this point, however, the amplitude of the pulse 74a is too great to apply to the modulator 37. Accordingly, the pulse is passed through a limiting amplifier 75, which may be either a diode or triode—to shear off all unnecessary voltage. The output of limiting amplifier 75 is designated by 75a.

The pulse form 75a is then passed through a cathode follower stage 76, which merely serves to match the output impedance of the electronic timer to the input impedance of the modulator 37. A cathode ray follower is essentially a distortionless unity amplifier shown in Fig. 5. Thus the control impulse derived from the electronic timer will not be affected by the addition of this isolating stage.

Thus, the sine-wave-oscillator timer has generated and formed a series of recurring pulses—of the proper duration and amplitude, and at the proper frequency which can now be used to control the action of the oscillator 31.

Modulator

The modulator can be considered as a sort of powerful electronic switch which directly controls the operation of the r. f. oscillator 31.

The modulator stage may appear in any of several different forms.

The simplest type of modulator consists of one or more power amplifier stages which introduces little or no distortion to the pulse form they amplify. Any of a large number of types of power-amplifying vacuum tubes may be used for this purpose, since radio frequencies are not required to be handled by the modulator.

Another type of modulator is shown diagrammatically in Fig. 6 and comprises an amplifier stage 170 connected to a "pulse forming network" comprised within the rectangle 171. The "pulse forming network" is a non-linear network that provides across its output terminals a sharper impulse as compared to the impulse derived from the electronic timer 36 and applied across its input terminals. The network 171 consists of a non-linear saturable inductance 172 connected to one of the output terminals through a condenser 173, said inductance 172 and condenser 173 being shunted by an inductance 174 and condenser 175. The saturable inductance 172 functions as an electronic switch since it has either a very high or a negligible impedance, depending upon its operating conditions. These operating conditions, which control the saturation of the inductance, can be controlled by the input wave from the electronic timer 36. The output pulse form thus developed is used to modulate the r. f. oscillator stage in the block 31.

Oscillator

The oscillator may be of the type shown in Fig. 7 comprising two tubes 180, 181. During quiescent periods between pulses from the modulator stage 37 the oscillator, shown in Fig. 7, cannot function, because a fixed negative bias of several hundred volts is applied to the grids of the tubes 180, 181 by means of the battery 182. However, when the control pulse from the modulator 37 is applied to the grid circuit, the high voltage of the positive-going pulse nullifies the fixed bias on the tubes and the triodes are permitted to oscillate at a resonant frequency determined by the system of tuned transmission rods. The r. f. oscillations take place only for the duration of the input control pulse, ceasing abruptly when the modulating pulse is removed.

The input capacitance-resistance network 183 of the circuit of Fig. 7 consists of a grid leak of fairly low value and a blocking condenser of several hundred micromicrofarads. There is no grid blocking action by this network. The U. H. F. output pulses from this oscillator are coupled inductively from the plate circuit, and can then be passed to the transmitter antenna 30 by means of a transmission line or, more probably, a wave guide.

As an alternative of the oscillator of Fig. 7 I may use an oscillator of the magnetron type shown in Fig. 10. The magnetron is widely used as a generator of ultra-high frequencies for two very significant reasons. It can produce stable r. f. oscillations of any frequency up to and exceeding 20,000 megacycles. And it can produce radio frequency pulses having phenomenally large amounts of peak power.

Certain types of magnetrons have an output exceeding a megawatt when operating at wave lengths of only a few centimeters. And the output of most other magnetrons is seldom less than 500 kilowatts at any operating wave length or frequency.

All of this is possible because of the magnetron's unique manner of operation: the control of electron movement by means of an electromagnetic field.

The magnetron is essentially a diode having a cylindrical anode, along the axis of which is located the filament of the tube. When the ends of the cylinder are closed, the interior of the device acts as a resonant chamber.

Around the outside of the magnetron is wound a coil capable of producing a very strong axial field. The lines of magnetic force are approximately parallel to the axes of the filament and the anode, and the magnetic field functions much in the manner of a grid in retarding the passage of electrons to the positively charged plate or anode.

Although some types of magnetrons have complex filament and anode structures, the physical structure of the basic magnetron, in general, is fundamentally simple, as shown in Fig. 8.

Electron paths viewed from the open end of a simple magnetron are shown in Fig. 9.

In the absence of a magnetic field around the tube, the electrons will travel in a straight line from the filament to the anode according to A of Fig. 9. But the introduction of a slight magnetic field—of small but stable value—will cause a curvature in the electron path (B of Fig. 9). The stronger the magnetic field, the greater the curvature of the electron path and the longer it will take for an electron to reach the anode—since the electron is being affected by two forces at right angles to each other.

The strength of the magnetic field can be slowly increased until, at a critical value of the field strength, the electron will miss the anode cylinder complete (C of Fig. 9) and, after describing a heart-shaped circular path, will return to the filament.

If the magnetic field intensity is increased beyond this critical value, the electron may be repelled by the cathode after completing its heart-shaped orbit. The electron may then make one or more excursions between the filament and the plate—each time following orbits in the interelectrode space—before finally coming to rest at the filament. This phenomena is illustrated by D of Fig. 9.

When the magnetron is operated with a magnetic field intensity just above the critical value, an electron will leave the filament, circle the resonant chamber, and return to the filament. Then the process will be repeated by the electron, and in this manner oscillations will be sustained.

One cycle is equivalent to an electron's journey out toward the anode and back to the filament, thus establishing the resonant frequency of the sustained oscillations.

By increasing the anode voltage of the magnetron, the electron can be speeded up. And thus, after a suitable readjustment of the magnetic field intensity, the magnetron can be made to sustain oscillations at any given frequency.

The action of a single electron in the resonant chamber of a magnetron is the identical action of the countless numbers of electrons actually emitted by the filament. In practical operation, the resonant chamber of a magnetron is dense with many electrons; each describing its own heart-shaped orbit, each moving at the same amount of time in completing its interelectrode journey.

The combined result of this electron movement is a stable U. H. F. oscillation of very high power.

A basic circuit showing the use of the magnetron as an R. F. pulse generator is given in Fig. 10.

In practical operation the magnetron does not oscillate during the quiescent period between modulator pulses, because the potential difference between the filament 190 and the anode 191 is not of sufficient value to sustain oscillations in the resonant chamber of the tube. However, when a high-voltage, negative-going control pulse from the modulator is applied to the filament of the magnetron, this has the same effect as applying an equally high positive voltage to the anode. With operating voltages and the magnetic field intensity at their optimum values, ultra-high-frequency oscillations will take place in the resonant chamber of the magnetron. When the modulator pulse is removed from the filament, the magnetron will cease oscillating. The output of the magnetron can be taken by means of a small loop 189 inserted in the interelectrode space between the filament and anode.

It is important to note that the modulator pulse applied to the magnetron must rise to its full voltage value as soon as possible, remain at that full value for the duration of the pulse, and then decrease to zero as soon as possible. In other words, a very steep-sided, flat-topped, rectangular pulse form is required to control the oscillation of the magnetron.

In considering the output pulses of the oscillator 31, two frequencies are involved: the U. H. F. carrier frequency at which the pulses are transmitted into space, and the relatively low, variable pulse recurrence frequency, usually between 250 and 5000 pulses per second.

In other words, the ultra-high frequency carrier of the oscillator 31 is modulated by means of the control pulses from the electronic timer 36. Thus, there are two frequencies taking place simultaneously: the carrier frequency of the ultra-high frequency oscillations, and the pulse recurrence frequency of the pulses, said pulse recurrence frequency representing the gamma ray intensity detected by the ionization chamber. Consequently, the oscillator 31 does not generate R. F. oscillations continuously. Between the recurrent pulses of ultra-high frequency energy, the oscillator 31 is quiescent for comparatively long intervals of time. For example, the oscillator 31 might generate R. F. energy for only 1 microsecond and then be turned off for a period of 999 microseconds.

Since the useful output power of the oscillator 31 is the power contained in the radiated pulses, the circuits of the oscillator are designed to concentrate as much power as possible into these brief and all-important R. F. pulses.

*Receiver*

The receiver 42 must supply considerable amplification with inherent stability and extreme sensitivity. The type of receiver used in the present application is of superheterodyne type and is diagrammatically shown in Fig. 11. The superheterodyne reception involves low power radio frequency fairly close to that received, and beating that against the received signals, forming an intermediate frequency which is then amplified many times.

By referring more particularly to Fig. 11 it comprises as essential elements a radio frequency amplifier 100, including one or more stages of R. F. amplification of conventional designs, local oscillator 101, mixer 102 for intermodulating the outputs of 100 and 101, intermediate frequency amplifier 103 connected to the output of the mixer 102, detector 104 for detecting the output of 104 and a low frequency amplifier 105 for amplifying the detected output.

*Frequency network*

The frequency network 53 comprises a current limiter 197 for limiting the magnitude of the impulses derived from the receiver 42. These impulses are then transmitted to a circuit comprised of an inductance 198 in series with a resistance 199 and produce across the terminals of the inductance 198 a voltage that increases in a definite relationship to the increase of the frequency recurrence of the impulses derived from the receiver 42. The terminals of the inductance 198 constitute the output terminals of the frequency network 53.

It is apparent that there are many other frequency networks well known in the art that may be used in place of the one described hereinabove. Any of the frequency networks selected for the present purpose has to be adapted to produce across its output terminals a D. C. voltage representing the frequency of the impulses applied across its input terminals.

Fig. 12 shows another embodiment of my invention which has as an object to provide an improved electrical method of geophysical survey which may be employed either during the drilling operation, or subsequent thereto, whereby the nature and structure of the formations in advance of the drilling tool, or immediately surrounding said tool, may be determined. The embodiment shown in Fig. 12 includes means whereby the resistivities of strata traversed by a drill hole may be measured or indicated during drilling operation at successive levels as they are contacted by the drill bit. As shown in Fig. 12, the drill hole 100 may be filled as usual with liquid 102, although in some cases no liquid is present. In said hole are the usual rotary drill pipes to the lower part 103 to which the drill bit 104 is fastened.

Two electrodes 105a, 105b, of relatively small dimensions, are countersunk in the under surface of bit 104, being embedded in blocks or casings 106 of insulating material, such as rubber or Bakelite. These electrodes are connected by insulated conductors 124 and 125, which pass through the bit, to other insulated conductors 126 and 127, respectively, inside the drill pipe 103. Conductors 126 and 127 are electrically connected at their ends to the terminals 132 and 134, respectively, of a resistance measuring device, constituted for example by a Wheatstone bridge, as shown. In this case each of the terminals 132, 134, constitutes one apex of the bridge, the other apices being designated 133 and 135, respectively. The bridge is fed by a source of current, 136, placed on diagonal 132—133, and the voltage to be measured appears across the terminals 134, 135, said voltage being applied across the resistor 101.

It is possible, by means of this assembly and in accordance with known methods, to measure the total resistance comprised between terminals 132 and 134, that is to say, the resistance of conductors 124, 125, 126 and 127, plus the resistance of the formation lying between the electrodes 105a, 105b. As shown in the drawing, the current passing through said electrodes passes also through the still intact formation just beneath the bit; wherefore the resistance to the passage of current through the circuit is proportional to the true resistivity of the formation. Furthermore, owing to the relatively small size of electrodes 105a, 105b, this resistance is considerable in comparison with the total resistances of the several conductors; and therefore the variations of the resistances of said conductors in function of their length and temperature, have no appreciable influence in practice on the precision of the measurements. Consequently, the resistance measured is, for practical purposes, proportional to that of the formation in contact with the underside of the bit. In order to determine the coefficient of proportionality it is only necessary to measure above ground the resistance between electrodes 105a and 105b, seeing that the bit is placed in a medium of known resistivity.

The electrodes 105a, 105b and all the wires connected to these electrodes are inserted into the bit 104 in such locations and in such manner that they do not interfere with the circulation of fluid through said bit during the course of the drilling. It is commonly the practice to cause a circulation of the fluid during the drilling in order to carry out of the drill hole the debris which otherwise would accumulate at the bottom thereof and interfere with the drilling. To this end the drill-hole fluid is pumped under pressure into the drill pipe and emerges around the bit, whence it is forced upward through the annular space outside the drill pipe. It is of course desirable that the openings (not shown in the drawings) through which the fluid passes should not be obstructed. Therefore, the electrodes and the conductors leading to them should be so disposed that they do not interfere with the circulation of said fluid during the drilling operation. This is readily accomplished by placing the several parts in recesses formed in the drill bit at suitable locations.

The drawings are not to be taken as indicating the size of the electrode relative to that of the bit, but merely as illustrating a suitable location for the electrode and its circuit connections. Its relative size is a matter of technical judgment and is readily determined.

It is therefore apparent that the voltage derived from the resistor 101 is indicative of the resistivity of the formation drilled. This voltage is applied to the electronic timer 36 and causes said electronic timer to switch the oscillator 31 on and off at a frequency representing the resistivity of the formation drilled. The circuit diagrams and performance of the electronic timer 36, modulator 37, oscillator 31, antennas 30 and 41, receiver 42, and frequency network 53 are identical in the arrangements of Fig. 1 and Fig. 12 and need not to be repeated here. Consequently, a constant barrage of electromagnetic pulses are radiated by the oscillator 31 through the antenna 30 and move upwardly within the drill hole. These pulses are radiated in succession at a frequency that represents the resistivity of the formation being drilled.

The receiving antenna 41 is conveniently located at the top of the drill hole for the reception of the signals traveling upwardly from the antenna 30. These signals are subsequently demodulated in the receiver 42 and transmitted to the frequency network 53, which in turn translates the frequency of the incoming impulses into an output voltage indicating this frequency, said output voltage being shown on a suitable meter 200. Consequently, the indication of the meter 200 represents at any instant the resistivity of the formations drilled.

I claim:

An apparatus for transmitting data from a well surveying subsurface instrument to a recording system located on the surface of the earth which comprises means for producing electrical signals varying in sympathy with the variation of a physical property of the strata traversed by the well, means for simultaneously producing a succession of ultra-high frequency electromagnetic impulses of equal duration, said means including an electronic timer adapted to produce electrical impulses of equal duration and at varying intervals of time, means for connecting said electronic timer to the means which produces electrical signals varying in sympathy with the variation of a physical property of the strata traversed by the well, an oscillator, a modulator, means for connecting the output of said modulator to said oscillator, means for connecting the output of said electronic timer to said modulator, and means for connecting the output of said oscillator to a directional antenna whereby the ultra-high frequency electromagnetic impulses controlled by said electronic timer and produced by the oscillator will be directionally radiated up the drill hole from the subsurface instrument.

SERGE A. SCHERBATSKOY.

REFERENCES CITED

The following references are of record in the file of this patent:

UNITED STATES PATENTS

| Number | Name | Date |
|---|---|---|
| 1,842,968 | Horvath | Jan. 26, 1932 |
| 2,225,668 | Subkow et al. | Dec. 24, 1940 |
| 2,283,429 | Ennis | May 19, 1942 |
| 2,285,809 | Davis | June 9, 1942 |
| 2,301,458 | Salvatori | Nov. 10, 1942 |
| 2,368,532 | Fearon | Jan. 30, 1945 |
| 2,380,520 | Hassler | July 31, 1945 |
| 2,416,328 | Labin | Feb. 25, 1947 |
| 2,418,268 | Lawson | Apr. 1, 1947 |